United States Patent
Roberts et al.

(10) Patent No.: US 8,108,535 B1
(45) Date of Patent: Jan. 31, 2012

(54) METHODS, SYSTEMS, AND PRODUCTS FOR SELECTING IMAGES

(75) Inventors: Thomas A. Roberts, Fuquay-Varina, NC (US); Gregory Morgan Evans, Raleigh, NC (US)

(73) Assignee: Quiro Holdings, Inc., Raleigh, NC (US)

(*) Notice: Subject to any disclaimer, the term of this patent is extended or adjusted under 35 U.S.C. 154(b) by 1200 days.

(21) Appl. No.: 11/479,059

(22) Filed: Jun. 30, 2006

(51) Int. Cl.
*G06F 15/16* (2006.01)

(52) U.S. Cl. ........ 709/231; 709/246; 725/109; 725/112; 725/139; 715/838

(58) Field of Classification Search .................. 709/231, 709/204, 205, 207; 382/173, 176; 358/2.1
See application file for complete search history.

(56) References Cited

U.S. PATENT DOCUMENTS

| | | | |
|---|---|---|---|
| 5,140,436 A | 8/1992 | Blessinger | |
| 6,072,645 A | 6/2000 | Sprague | |
| 6,167,186 A | 12/2000 | Kawasaki et al. | |
| 6,243,531 B1 | 6/2001 | Takeuchi | |
| 6,263,147 B1 | 7/2001 | Tognazzini | |
| 6,272,282 B1 | 8/2001 | Yamagata et al. | |
| 6,606,448 B1 | 8/2003 | Terauchi | |
| 6,614,986 B2 | 9/2003 | Tognazzini | |
| 6,961,083 B2 | 11/2005 | Obrador et al. | |
| 7,251,790 B1 * | 7/2007 | Drucker et al. | 715/838 |
| 7,650,626 B2 * | 1/2010 | Suh | 725/139 |
| 2002/0048043 A1 * | 4/2002 | Takahashi et al. | 358/1.15 |
| 2002/0087728 A1 * | 7/2002 | Deshpande et al. | 709/246 |
| 2003/0118329 A1 | 6/2003 | Obrador | |
| 2003/0123853 A1 * | 7/2003 | Iwahara et al. | 386/69 |
| 2003/0197785 A1 | 10/2003 | White et al. | |
| 2004/0202443 A1 | 10/2004 | Obrador et al. | |
| 2004/0218059 A1 | 11/2004 | Obrador et al. | |
| 2004/0252193 A1 | 12/2004 | Higgins | |
| 2005/0048916 A1 * | 3/2005 | Suh | 455/39 |
| 2005/0177859 A1 | 8/2005 | Valentino et al. | |
| 2006/0210253 A1 * | 9/2006 | Bak et al. | 386/95 |
| 2008/0163321 A1 * | 7/2008 | Liwerant et al. | 725/112 |
| 2008/0172705 A1 * | 7/2008 | Liwerant et al. | 725/109 |

* cited by examiner

*Primary Examiner* — Yves Dalencourt
(74) *Attorney, Agent, or Firm* — Withrow & Terranova, PLLC

(57) ABSTRACT

Methods, systems, and products are disclosed for selecting images from media. As a media stream is processed for display, thumbnail images are extracted at a periodic rate from the media stream. The media stream and the thumbnail images are concurrently processed for display.

12 Claims, 9 Drawing Sheets

METHODS, SYSTEMS, AND PRODUCTS FOR SELECTING IMAGES

BACKGROUND

This application generally relates to streaming media and, more particularly, to selecting images from media streams.

Users often want snapshots or video snippets when streaming. As the user watches streaming media, the user may wish to obtain images, or "snapshots," of a scene. Some users may even wish to record a short video snippet from the media stream. Screen capture techniques, for example, may be used to save an image shown on a display device. The user may even purchase and install software that records streaming media. These conventional techniques, however, do not provide high-quality, high-resolution images and video. Because these conventional techniques are generated from low-resolution streams, the images and video are limited to the resolution of the streamed media. Moreover, these conventional techniques do not permit capturing images or video for scenes that previously occurred, unless of course the user records and replays streamed media.

The recent FIFA World Cup™ provides an example. Suppose a live soccer match is streamed to users. When the ball enters the net, users know that a goal has been scored. Because soccer is a fast-paced game, though, many users may have missed the striker's foot kicking the ball, or the ball passing just beyond the keeper's outstretched hands. These images, or this entire video sequence, may be desirable to users. Conventional techniques, however, do not permit reviewing and recording this previous action. What is needed, then, are methods, systems, and products that permit selecting images and video snippets, even if those images and snippets previously occurred.

SUMMARY

The problems noted above, along with other problems, may be reduced or eliminated by embodiments of the present invention using methods, systems, and products that select images and/or video snippets from streaming media. This invention allows any number of users to select images and/or video snippets from streaming media. This invention, in particular, allows a user to select images and video snippets after an event has already occurred. As a user views a media stream, the exemplary embodiments of this invention periodically extract thumbnail images from the media stream. The thumbnail images are then stored in memory, along with a time code. Whenever the user sees a scene or segment worth capturing, the user may access the memory and retrieve one or more thumbnail images containing the desired scene or action. That is, because the thumbnail images may be sequentially arranged in time, the user may review thumbnail images from previous time periods, as compared to a current scene or time code. Returning to the FIFA WORLD CUP™ example, when the user sees the soccer ball enter the net, the user may access the extracted thumbnail images and retrieve the image of the striker's foot kicking the ball. The user may then permanently store this image, and the user may even store a video snippet of the entire goal sequence. The exemplary embodiments even permit the user to obtain high-resolution versions of the images and video, as later paragraphs will explain. The present invention, then, permits the user to select images and video, even after an event has already occurred.

According to aspects of the present invention, a method is disclosed for selecting images from streaming media. As a media stream is processed for display, thumbnail images are extracted at a periodic rate from the media stream. The media stream and the thumbnail images are concurrently processed for display.

According to another aspect of the present invention, a system is disclosed for selecting images from media streams. A media player application is stored in memory, and a processor communicates with the memory and with the media player application. The system processes a media stream and extracts thumbnail images at a periodic rate. The system concurrently processes the media stream and the thumbnail images for display, thus permitting a user to simultaneously view the media stream and the extracted thumbnail images.

In yet another aspect, a computer program product is disclosed for selecting images from media streams. The computer program product comprises a computer-readable media that stores instructions for processing streaming media, such as a media stream. Thumbnail images are extracted from the streaming media at a periodic rate. A time code is also extracted from the streaming media that corresponds to each extracted thumbnail image. The extracted thumbnail images are stored in memory and processed in a time sequence according to the time code associated with each extracted thumbnail image. The extracted thumbnail images and the streaming media are concurrently processed for display.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
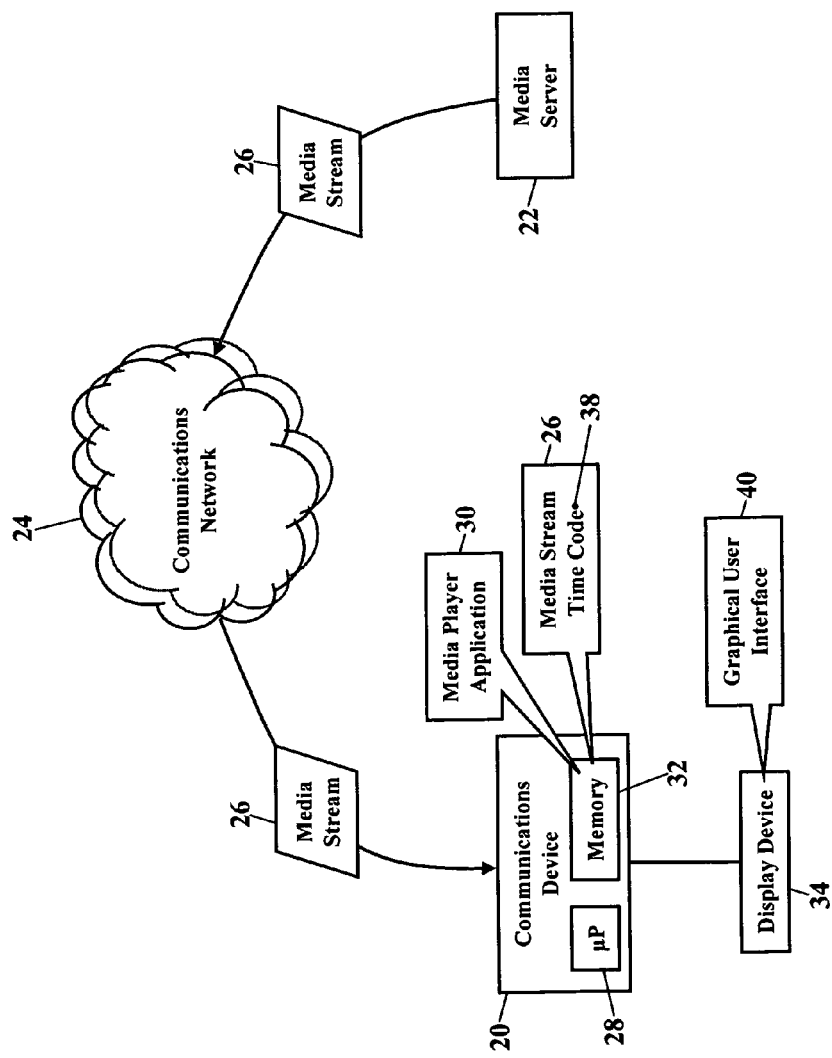
FIG. 1 is a schematic illustrating an environment in which exemplary embodiments of the present invention may be implemented.

FIG. 1 is a schematic illustrating a network environment in which exemplary embodiments of the present invention may be implemented. A user's communications device 20 communicates with a media server 22 via a communications network 24. Although the user's communications device 20 is generically shown, the communications device 20, as will be later explained, may be any computer, analog/digital video recorder, set top box, personal digital assistant, cordless/cellular/IP phone, or any other processor-controlled device. Whatever the user's communications device 20, the user's communications device 20 receives a media stream 26 from the media server 22. The media stream 26 may comprise any digital data, such as music, videos, and/or pictures. The user's communications device 20 has a processor 28 (e.g., "µP"), application specific integrated circuit (ASIC), or other similar device that executes a media player application 30 stored in memory 32. The media player application 30 is a software engine or application that receives and processes the media stream 26. The media player application 30 executes/plays music, videos, pictures, and other digital media. The media player application 30 instructs the processor 28 to process the media stream 26 for display on a display device 34.

Here the media player application 30 also generates thumbnails. As the user's communications device 20 receives the media stream 26, the media player application 30 may store the media stream 26 in the memory 32. The media player application 30, for example, may temporarily store the media stream 26 in buffer memory before conversion to sound or pictures. As the media player application 30 processes the media stream 26, the media player application 30 extracts thumbnail images 36 from the media stream 26. The media player application 30 also extracts a time code 38 from the media stream 26 that corresponds to each extracted thumbnail image. As those of ordinary skill in the art understand, the media stream 26 comprises media data that are sequenced according to time. Each time code 38 represents a measurement of time, interval of time, or offset occurring since the beginning of the media stream 26. Each time code 38 may be associated with one or more stores of frame buffer memory, wherein the frame buffer memory is purged or deleted according to a screen/display refresh schedule or setting (e.g., 30 frames per second). The media player application 30 associates the time code 38 to the corresponding thumbnail image, and the extracted thumbnail images 36 are stored in the memory 32. The thumbnail images 36 may, or may not be, concurrently processed for display in a graphical user interface 40. The media player application 30 causes the processor 28 to visually and/or audibly present both the media stream 26 and the extracted thumbnail images 36 on the display device 34. As the user views the media stream 26, the user may concurrently view the extracted thumbnail images 36.

This invention allows the user to select images after an event has occurred. As the user views the media stream 26, the user may see (or hear) a moment or scene deserving permanent storage. Because the thumbnail images 36 are periodically extracted from the media stream 26 (as opposed to being separately streamed from the media server 22), the user may access the memory 32 and retrieve an individual thumbnail image that contains the desired moment or scene. The user may review thumbnail images from previous time periods, as compared to a current time code. Because each thumbnail image is associated with a time code, the user may review previous thumbnail images 36 occurring prior to the current time code 38 of the current screen frame. Returning to the FIFA WORLD CUP™ example, suppose the media stream 26 represents a streamed soccer match. When a player scores a goal, the user may have missed a thrilling or skillful moment. The viewing user, for example, may have seen the ball enter the goal, but the user may have missed striker's foot kicking the ball. Ordinarily the user would be unable to regress or "rewind" the media stream 26 and view the kick. Exemplary embodiments of the present invention, however, allow the user to access the extracted thumbnail images 36 from previous time periods or from previous screen frames. The user may then select the one or more thumbnail images that show the striker's foot kicking the ball.

Exemplary embodiments of the present invention may be applied to any media server and to any media player application. The media server 22, for example, may be configured as a conventional web server or as a specially-configured streaming server. The media player application 30 may be any software application, plug-in, and/or hardware component that processes digital media. Exemplary embodiments of the present invention may even be incorporated into existing media players, such as Microsoft's Media Player and RealNetwork's REALPLAYER™.

The user's communications device 20 and the media server 22 are only simply illustrated. Because the architecture and operating principles of media devices are well known, the hardware and software components of the user's communications device 20 and the media server 22 are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE (3rd. Edition 2004).

Some aspects of streaming media and image capture are known, so this disclosure will not greatly explain the known details. If the reader desires more details, the reader is invited to consult the following sources, all incorporated herein by reference in their entirety: U.S. Pat. No. 5,140,436 to Blessinger (Aug. 18, 1992); U.S. Pat. No. 6,072,645 to Sprague (Jun. 6, 2000); U.S. Pat. No. 6,167,186 to Kawasaki et al. (Dec. 26, 2000); U.S. Pat. No. 6,243,531 to Takeuchi et al. (Jun. 5, 2001); U.S. Pat. No. 6,263,147 to Tognazzini (Jun. 17, 2001); U.S. Pat. No. 6,272,282 to Yamagata et al. (Aug. 7, 2001); U.S. Pat. No. 6,606,448 to Terauchi (Aug. 12, 2003); U.S. Pat. No. 6,614,986 to Tognazzini (Sep. 2, 2003); U.S. Pat. No. 6,961,083 to Obrador et al. (Nov. 1, 2005); Published U.S. Patent Application 2003/0118329 to Obrador (Jun. 26, 2003); Published U.S. Patent Application 2003/0197785 to White et al. (Oct. 23, 2003); Published U.S. Patent Application 2004/0202443 to Obrador et al. (Oct. 14, 2004); Published U.S. Patent Application 2004/0218059 to Obrador et al. (Nov. 4, 2004); Published U.S. Patent Application 2004/0252193 to Higgins (Dec. 16, 2004); and Published U.S. Patent Application 2005/0177859 to Valentino, III et al. (Aug. 11, 2005).

Figure 2:
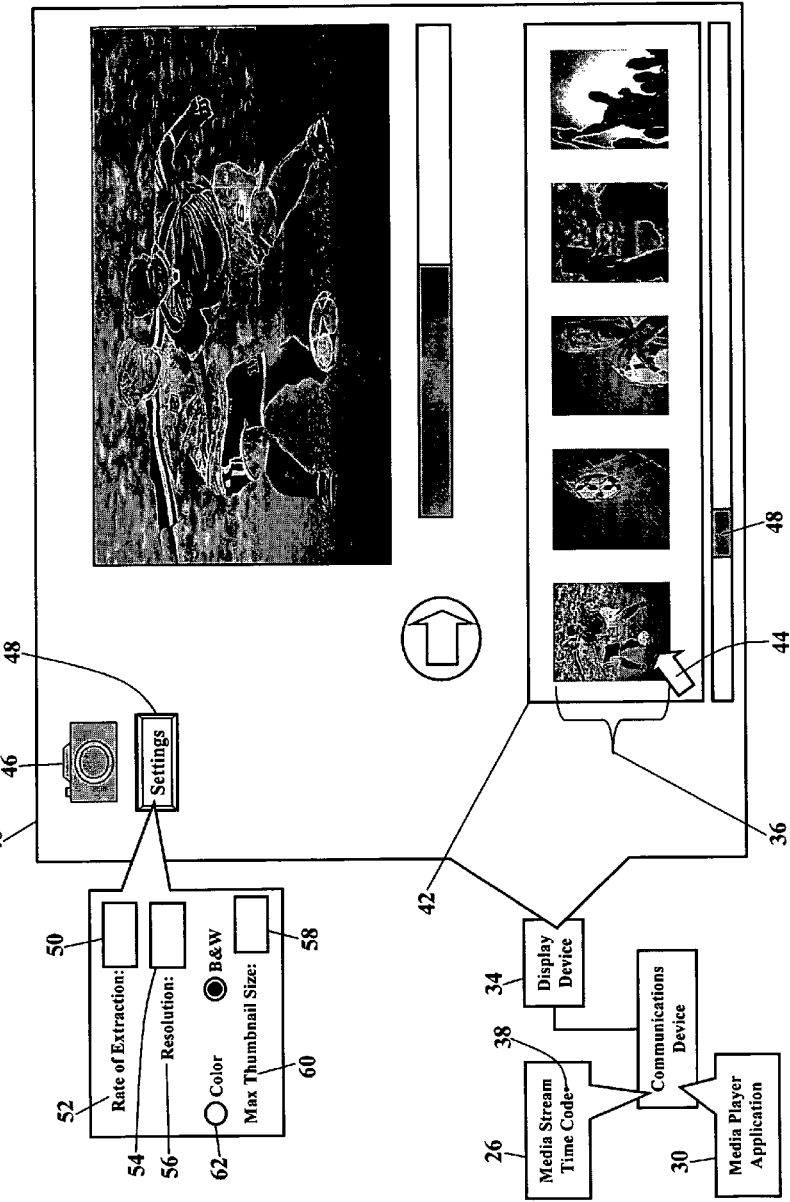
FIG. 2 is a schematic illustrating the graphical user interface XX, according to more aspects of the present invention.

FIG. 2 is a schematic illustrating the graphical user interface 40, according to more aspects of the present invention. The graphical user interface 40 accepts user inputs or commands to select one or more thumbnail images. Here the graphical user interface 40 also includes at least one control 42 associated with the extracted thumbnail images 36. FIG. 2 illustrates the extracted thumbnail images 36 scrolling within the control 42, yet the thumbnail images 36 may be displayed at any location, and/or in any manner, within the graphical user interface 40. FIG. 2 also illustrates the media stream 26 being concurrently displayed within the graphical user interface 40. The media player application 30 processes the extracted thumbnail images 36 in a time sequence according to the time code 38 associated with each extracted thumbnail image. The media player application 30 thus chronologically arranges the extracted thumbnail images 36 and visually and/or audibly presents the thumbnail images 36 in the control 42. As the user watches the media stream 26, the extracted thumbnail images 36 scroll across the graphical user interface 40.

The user may select any desired thumbnail image. As the thumbnail images 36 scroll across the control 42, the media player application 30 accepts an input that selects a desired image. The user, for example, user may place a curser 44 and "click" the desired image. The user, for example, may right-click on a particular thumbnail image to add that image to memory, a shopping cart, or other gathering place. If the user selects a snap button control 46, the media player application 30 would add a thumbnail image (such as a current thumbnail at the current time code) to the gathering area. The media player application 30, however, may accept any input, whether received from a keyboard/keypad, tactile device, touch screen, or any other user interface. The graphical user interface 40 may even include a slider control 48 that allows the user to retrieve and to view previous thumbnail images. When the user selects a particular thumbnail image, that image may stop, stall, or hover within the control 42, thus giving the user time to further review the image.

The user may configure the thumbnail images 36. The graphical user interface 40 may include a settings control 48 that configures the media player application 30. When the user selects the settings control 48, the user may establish various parameters for extracting the thumbnail images. As FIG. 2 illustrates, the settings control 48 may include a data field 50 for a rate 52 of extraction. The user may select the rate 52 of extraction at which the thumbnail images 36 are extracted. The rate 52 of extraction will partially determine how quickly the memory 32 is consumed. If, for example, the rate 52 of extraction is one image per second, the memory 32 may be consumed rather quickly. Moreover, a fast/high rate 52 of extraction (e.g., one image per second) may be difficult for some users to visually discern. When, however, the rate 52 of extraction is one image per five seconds or greater, then the memory 32 may store more images and the scrolling control 42 is easier to discern. If the data field 50 for the rate 52 of extraction is empty or undecipherable, the media player application 30 may prompt the user and/or establish a default setting. The default setting may be determined by examining the available memory 32 and/or the time length of the media stream 26. The default setting may be learned from user habits, such as historical extraction rates for other media stream and/or a frequency at which the user historically selects images. The media stream 26 may even include headers or metadata that establishes a permissible, desirable, or minimum/maximum rate of extraction.

As FIG. 2 also illustrates, the user may select a resolution of the thumbnail images 36. The settings control 48 may include a data field 54 for a resolution 56. The resolution of each thumbnail image is user-adjustable, meaning the user may select the resolution 56 at which the thumbnail images 36 are generated. The media player application 30 periodically generates the thumbnail images 36, relative to the number of frames per second in the media stream 26. The resolution 56 will partially determine how quickly the memory 32 is consumed. If, for example, the resolution 56 is large, the images will contain fine details, but the memory 32 may be quickly consumed. If, however, the resolution 56 is low, then the images may contain fewer details, but the memory 32 may store more images. The user, however, may configure the resolution 56, depending on the media event and their desire for high/low quality images. Suppose the media stream 26 contains frames having a data resolution of 640×480 pixels. The user may then establish a lower/smaller resolution of 36×17 pixels to conserve memory 32. If the data field 54 for the resolution 56 is empty or undecipherable, the media player application 30 may prompt the user and/or establish a default setting. The default setting may again be determined by examining the available memory 32, the time length of the media stream 26, user habits, past/historical resolution settings, headers, and/or metadata.

The settings control 48 may alter other parameters. The settings control 48 may permit the user to allocate memory to the thumbnail images 36. The settings control 48, for example, may include a memory data field 58 in which the user may specify a maximum byte size 60 for any individual extracted image. The memory data field 58 may additionally be used to specify the total memory space that is allocated to all the extracted images associated with the media stream 26. The user, for example, may configure an adjustable memory buffer, in which the extracted images are stored. The memory buffer may be large enough to store thumbnails for an entire streamed program. If memory were limited, the extracted images could be stored in a first-in, first-out (FIFO) system. A color data field 62 may also be used to further reduce memory consumption. The user may choose whether the extracted images are generated in color or less-consumptive back and white. The settings control 48 may even include fields or icons for enabling or disabling the media player application 30.

Figure 3:
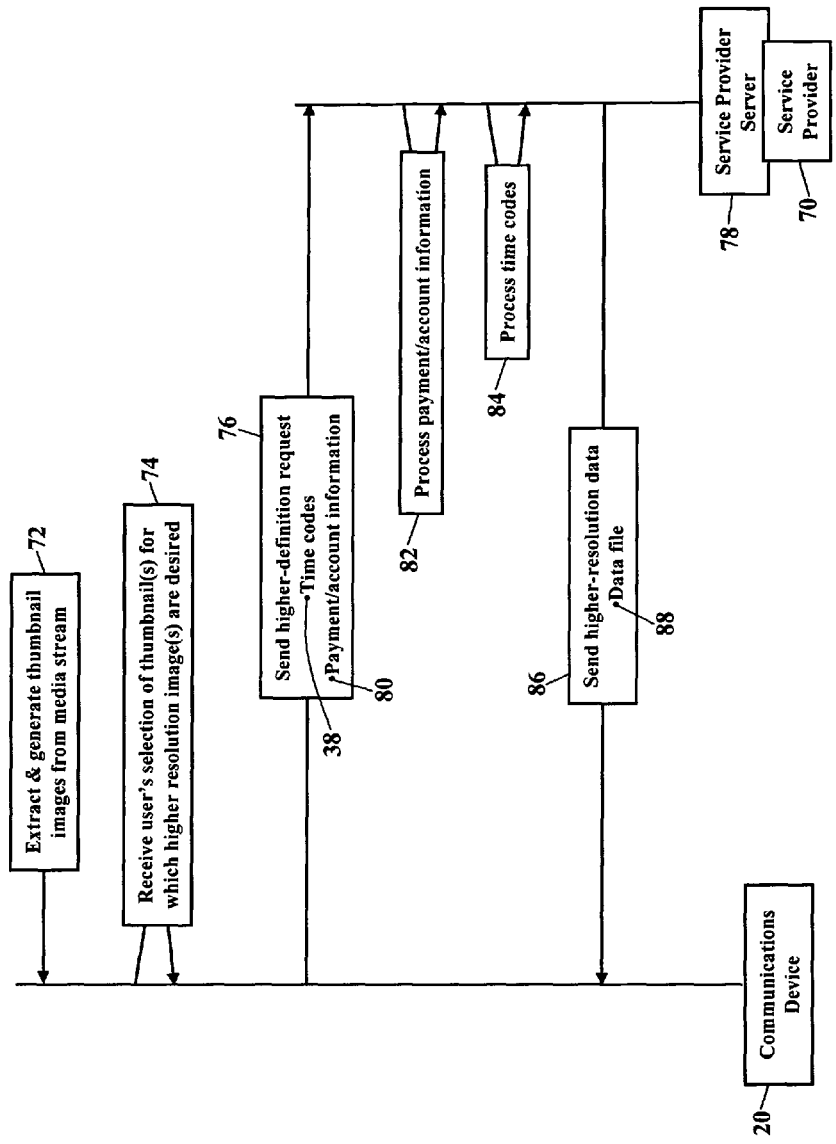
FIG. 3 is a schematic illustrating a process for high-resolution image requests, according to more exemplary embodiments of the present invention.

FIG. 3 is a schematic illustrating a process for high-resolution image requests, according to more exemplary embodiments of the present invention. Here the user may request and obtain high-resolution images that correspond to the thumbnail images 36. As the above paragraphs explained, the scrolling thumbnail images 36 allow the user to review past streaming events. The user may access and retrieve the thumbnail images 36 and view "snapshots" of the media stream 26. The thumbnail images 36, however, may be limited in resolution (to conserve memory), especially when compared to a high-resolution source. Suppose, again, that the media stream 26 represents a soccer match. A source camera filming the soccer match often provides higher resolution data than can be streamed to the user's communications device 20. If the source camera captures data having five megapixels (or more) per frame, such large data sets may require too much bandwidth to efficiently stream to the user's communications device 20. The media stream 26, then, may be streamed at a lower resolution. The higher-resolution source data exists, but the physical infrastructure (e.g., network bandwidth) limits the media quality that can be streamed to the user's communications device 20.

FIG. 3, however, illustrates how higher-resolution image data may be obtained. A service provider 70 offers higher-resolution data than can be streamed to the user's communications device 20. As the user's communications device 20 receives the media stream 26, the thumbnail images are extracted and generated (Step 72). As the user reviews the thumbnail images 36, the user may select individual thumbnails for which higher resolution images are desired (Step 74). As the above paragraphs explained, the media player application 30 accepts any input that selects a desired image. However the selections are made, the media player application 20 may cause the processor 28 to send a higher-definition request (Step 76). The higher-definition request contains or comprises information that requests higher-resolution images of the selected thumbnail images 36. The higher-definition request may comprise the time codes 38 associated with the selected thumbnail images 36. The higher-definition request communicates to the service provider's server 78. The server 78 is operated by, or on behalf of, the service provider 70. The service provider 70 may charge a fee for the higher-resolution images, so the higher-definition request may also include payment and/or account information 80.

The service provider 70 processes the user's request. When the service provider's server 78 receives the higher-definition request, the payment/account information 80 may be processed for payment (Step 82). The service provider's server 78 also processes the time codes 38 associated with the selected thumbnail images 36 (Step 84). The service provider's server 78, for example, may associate the time codes 38 to the higher-resolution data (such as the five megapixel frame data from the source camera, in the above soccer example). The higher-resolution data, corresponding to each time code 38, is obtained and then communicated to the user (Step 86). A higher-resolution data file 88, for example, may be communicated to the user's communications device 20. The higher-resolution data file 88 may correspond to the same time code(s) as one or more selected thumbnail images. If the higher-resolution data file 88 is too large to electronically communicate, the service provider 70 may additionally or alternatively physically mail/ship a CD, DVD, or other media storage device comprising the higher-resolution data file 88. The service provider 70 may additionally or alternatively mail/ship paper copies of the higher-resolution images to a physical address associated with the user.

Figure 4:
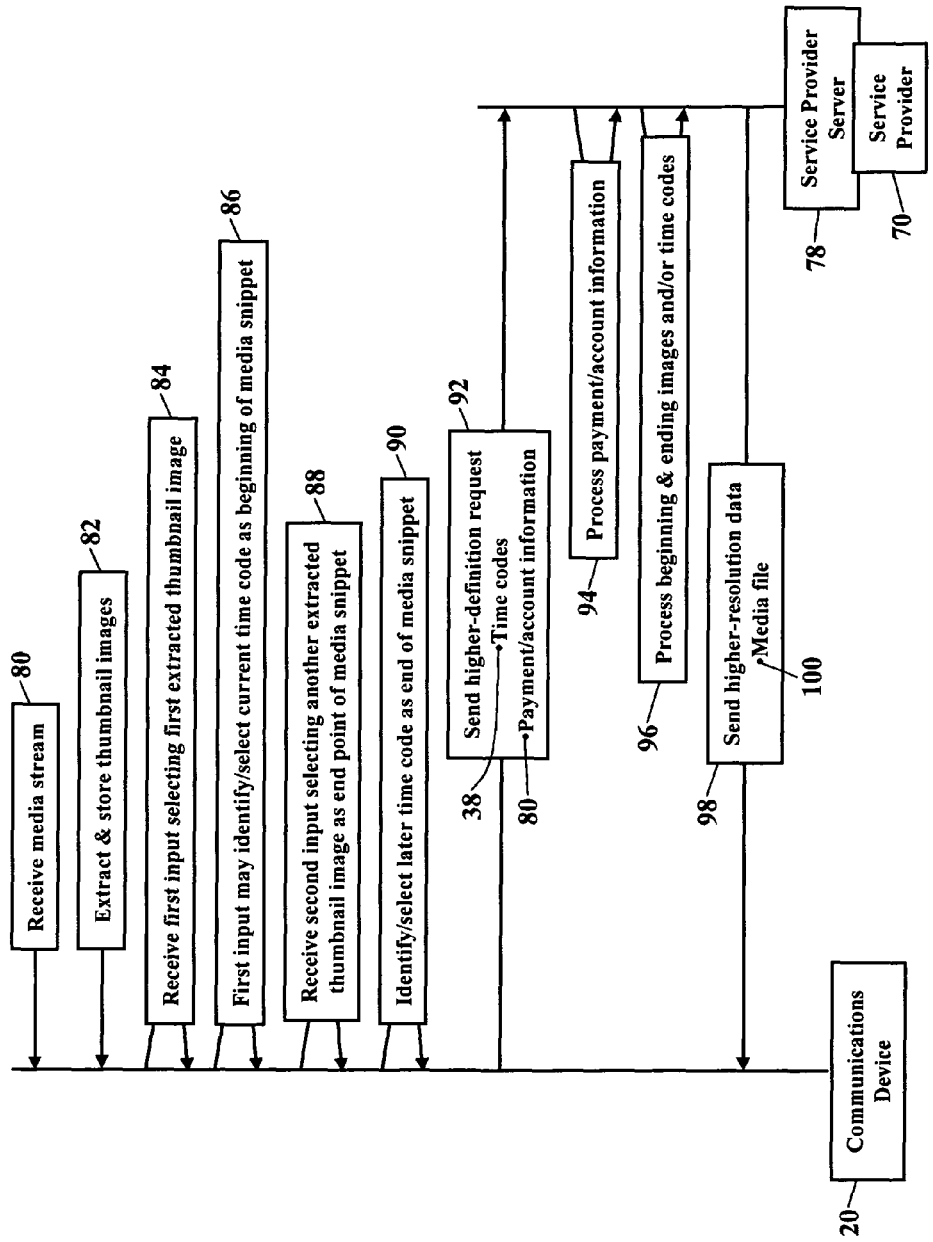
FIG. 4 is a schematic illustrating a process for high-resolution video snippets, according to more exemplary embodiments of the present invention.

FIG. 4 is a schematic illustrating a process for high-resolution video snippets, according to more exemplary embodiments of the present invention. Here the exemplary embodiments may be used to provide the user with higher-resolution video snippets. The service provider 70 may offer high-resolution video data of an event or movie, but that high-resolution video data may consume too much bandwidth to be efficiently streamed to the user's communications device 20. The present invention, however, may be used to obtain a higher-resolution video snippet, clip, segment, or portion of the media stream 26. That is, the present invention allows the user to request and receive a higher-resolution video snippet of the media stream 26. Should the user desire a higher-resolution portion of the media stream 26, exemplary embodiments may be used to obtain that higher-resolution portion. The user selects two extracted thumbnail images, and exemplary embodiments identify, in short, higher-resolution video data that occurs between the two thumbnail images. This higher-resolution video data is provided as a video snippet to the user.

FIG. 4 provides an illustration. The user's communications device 20 receives the media stream (Step 80), and the thumbnail images are extracted and stored in memory (Step 82). As the user reviews the thumbnail images 36, the media player application 30 receives a first input that selects an extracted thumbnail image (Step 84). This first input identifies a beginning point or location of a higher resolution media snippet. The first input may identify or select a current time code from the media stream as the beginning of the media snippet (Step 86). The media player application 30 may also receive a second input that selects another extracted thumbnail image as an end point or location of the media snippet (Step 88). The second input may identify or select a later time code as the end of the media snippet (Step 90). The media player application 20 may cause the processor 28 to send the higher-definition request (Step 92). The higher-definition request contains or comprises information that describes the beginning and ending thumbnail images and/or time codes. The higher-definition request communicates to the service provider's server 78, and the higher-definition request may include the payment/account information 80 for the media snippet.

The service provider 70 processes the user's request. When the service provider's server 78 receives the higher-definition request, the payment/account information 80 may be processed for payment (Step 94). The service provider's server 78 also processes the beginning and ending thumbnail images and/or time codes (Step 96). The service provider's server 78, for example, may associate the beginning and ending thumbnail images and/or time codes to the higher-resolution media data. The higher-resolution data is obtained and communicated to the user (Step 98). A higher-resolution media file 100, for example, may be communicated to the user's communications device 20 via email or FTP/download. The service provider 70 may additionally or alternatively physically mail/ship a CD, DVD, or other media storage device comprising the higher-resolution media file 100.

Figure 5:
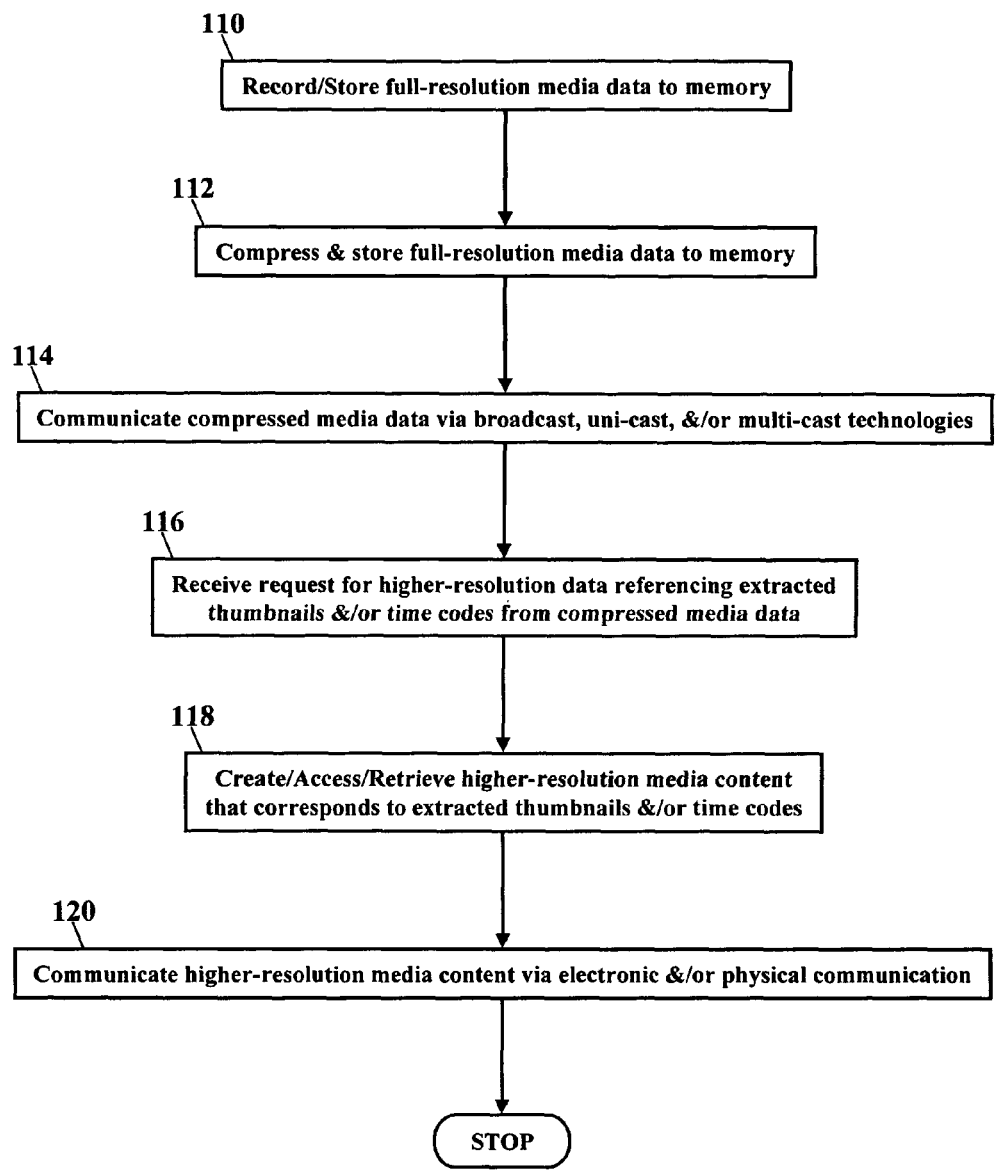
FIG. 5 is a flowchart illustrating a method of providing higher-resolution streaming data, according to still more exemplary embodiments of the present invention.

FIG. 5 is a flowchart illustrating a method of providing higher-resolution streaming data, according to still more exemplary embodiments of the present invention. Full-resolution media data is recorded or stored to memory (Step 110). The full-resolution media data is compressed and stored to memory (Step 112). Compressed media data is communicated via broadcast, uni-cast, and/or multi-cast technologies (Step 114). A request is received for higher-resolution data, and the request may reference extracted thumbnails and/or time codes from the compressed media data (Step 116). Higher-resolution media content is then created, accessed, or retrieved that corresponds to the extracted thumbnails and/or time codes (Step 118). That higher-resolution media content is communicated via electronic and/or physical communication (Step 120).

Figure 6:
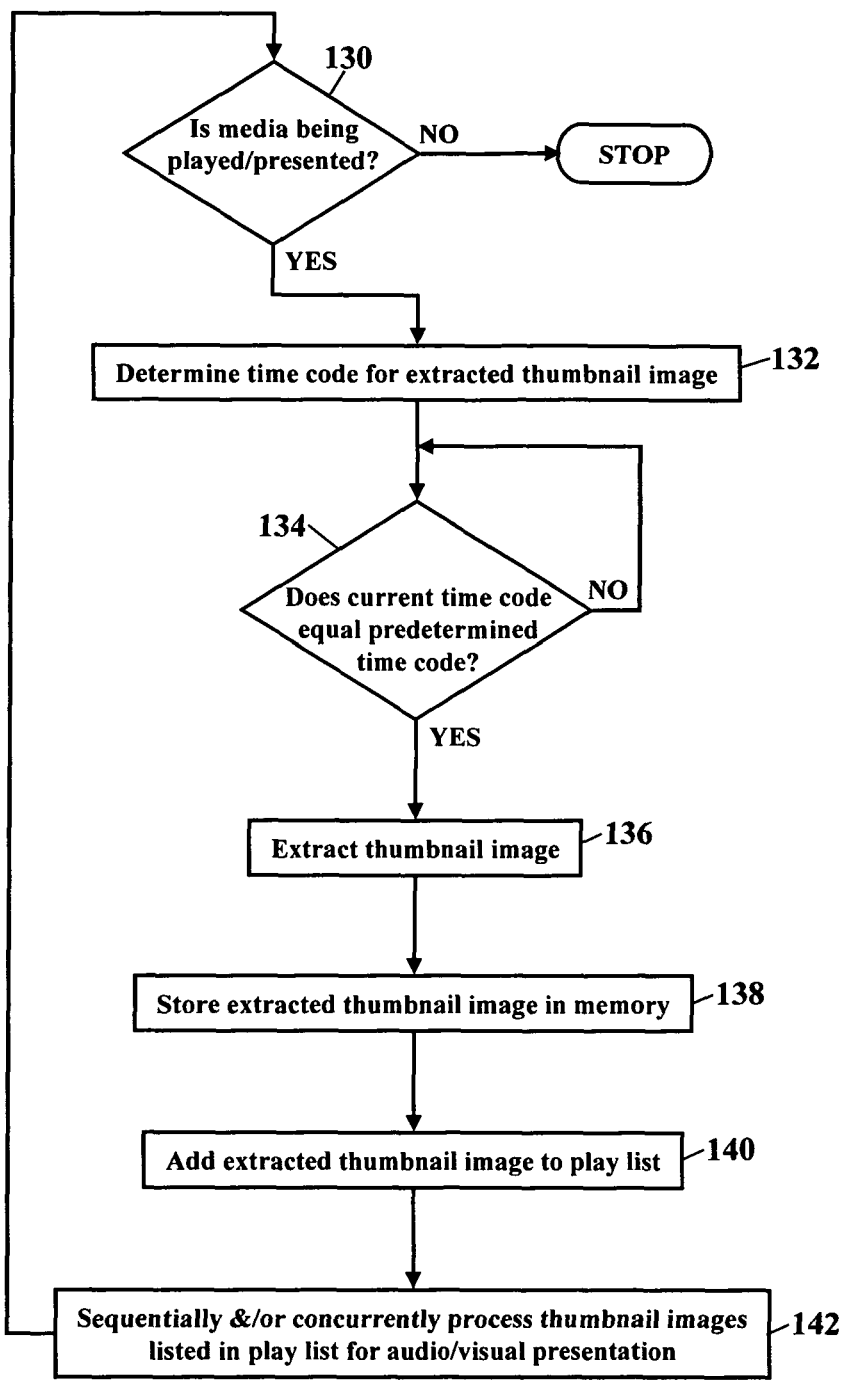
FIG. 6 is a flowchart illustrating a method of extracting thumbnail images from a media stream, according to still more exemplary embodiments of the present invention.

FIG. 6 is a flowchart illustrating a method of extracting thumbnail images from a media stream, according to still more exemplary embodiments of the present invention. Here exemplary embodiments of the present invention may be applied to any media content, not just streaming media. That is, thumbnail images may be extracted from any media, whether or not that media is streamed, downloaded, or retrieved from a local source (e.g., CD or DVD). If the media is playing or being audibly/visually presented (Block 130), then a time code is determined for an extracted thumbnail image (Block 132). When that time code is reached (Block 134), the thumbnail image is extracted (Block 136). The extracted thumbnail image is stored in memory (Block 138) and added to a play list (Block 140). The thumbnail images described in the play list are then sequentially and concurrently processed for audio/visual presentation (Block 142).

Figure 7:
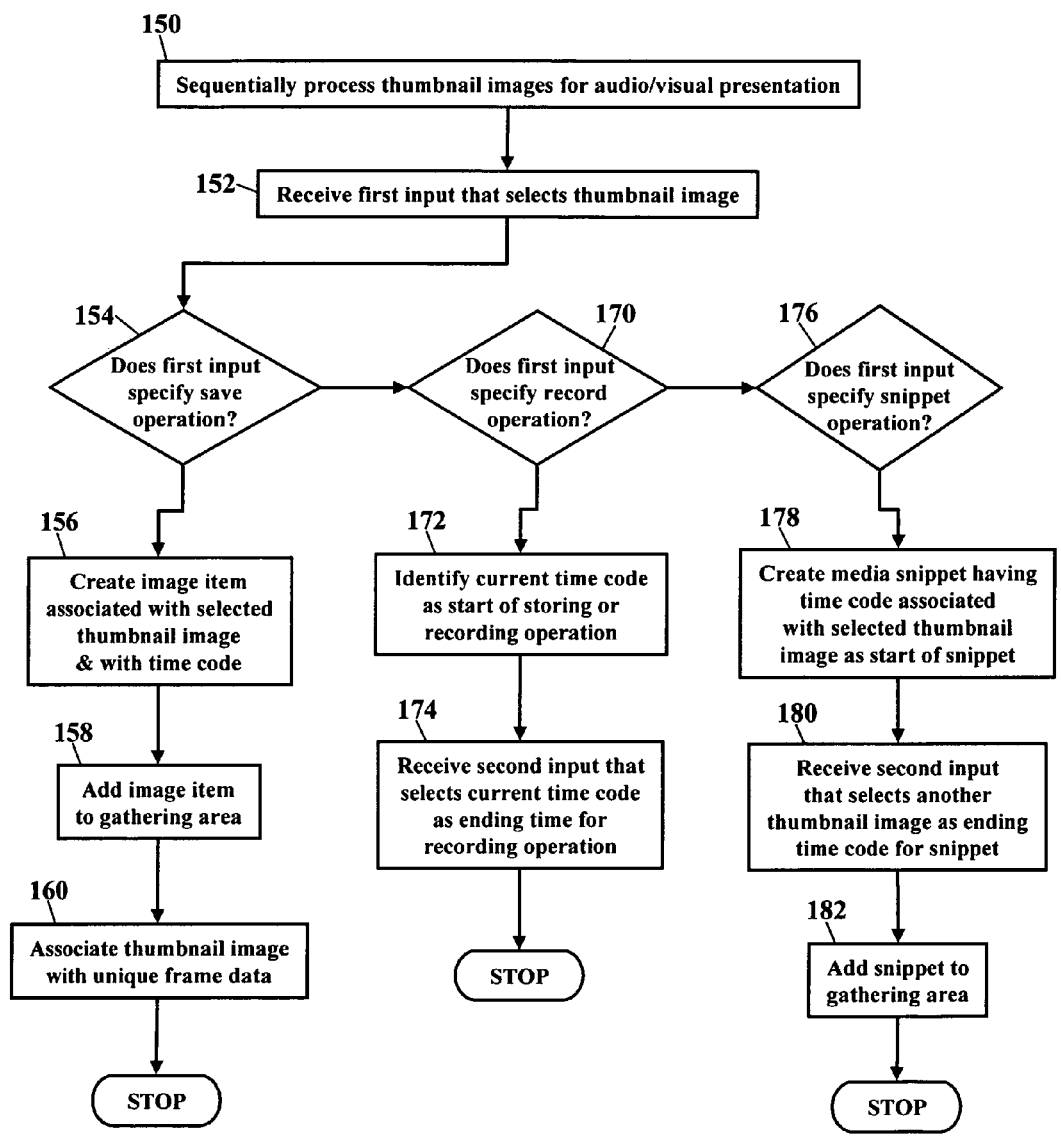
FIG. 7 is a flowchart illustrating a method of selecting thumbnail images, according to even more exemplary embodiments of the present invention

FIG. 7 is a flowchart illustrating a method of selecting thumbnail images, according to even more exemplary embodiments of the present invention. The thumbnail images are sequentially processed for audio/visual presentation (Block 150). A first input is received that selects a thumbnail image (Block 152). If the first input specifies a save operation (Block 154), then an image item is created and associated with the selected thumbnail image and with a time code associated with the selected thumbnail image (Block 156). The image item may then be added to a gathering area (Block 158), such as a shopping cart or memory. The selected thumbnail image may be marked, indicated, flagged, or otherwise associated with unique, different, or special frame data (Block 160). If the first input specifies a record operation (Block 170), then the current time code associated with the media stream is used to identify a start of a storing/recording operation (e.g., a "snapshot" operation) (Block 172). A second input may select the current time code as an end time for the recording operation (Block 174). If the first input specifies a media snippet operation (Block 176), then a media snippet is created having the time code associated with the selected thumbnail image as a start of the media snippet (Block 178). The second input that selects another thumbnail image may indicate/identify an ending time code for the media snippet (Block 180). The media snippet may be added to the gathering area (Block 182).

Figure 8:
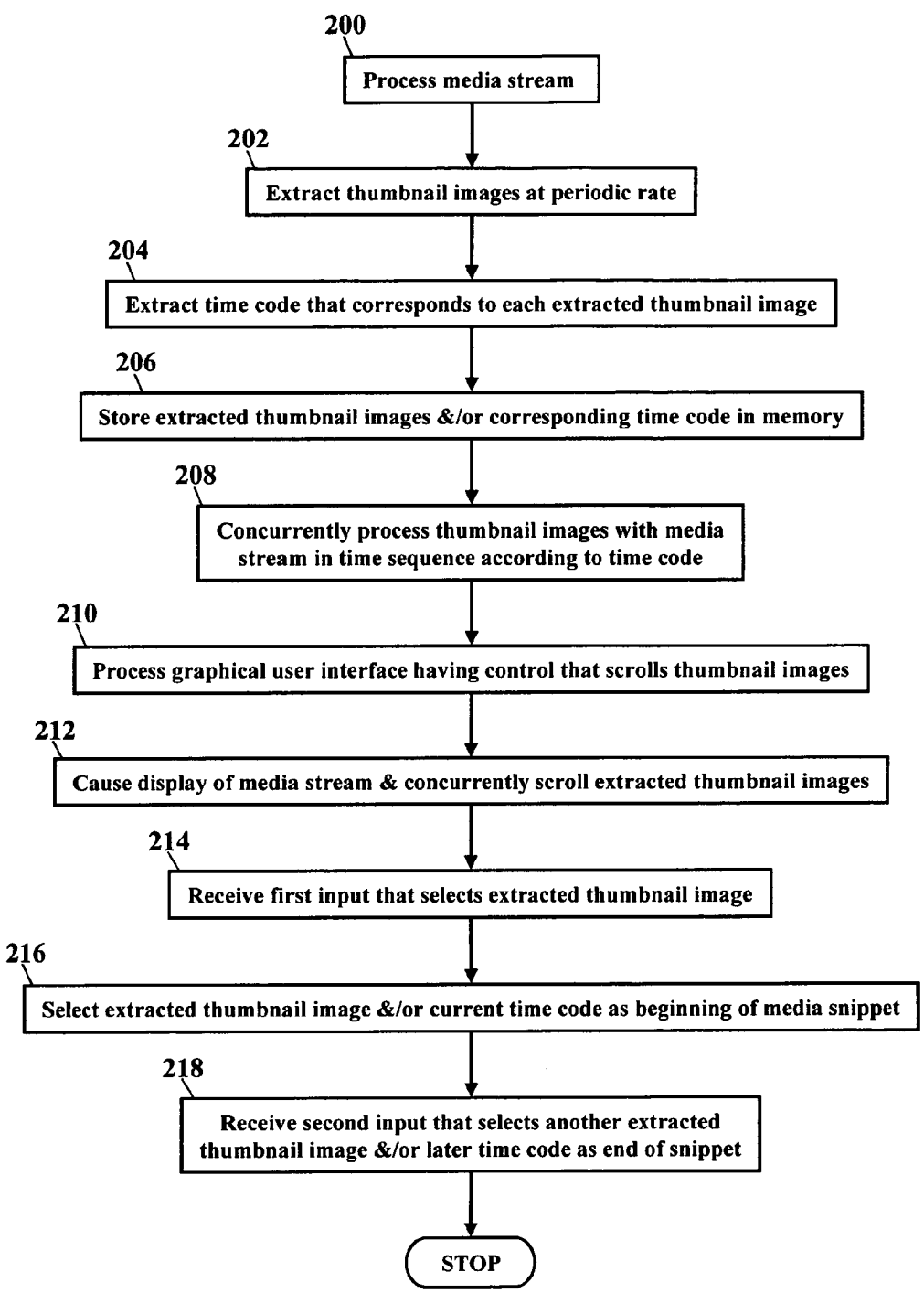
FIG. 8 is a flowchart illustrating a method of selecting images, according to exemplary embodiments of the present invention.

FIG. 8 is a flowchart illustrating a method of selecting images, according to exemplary embodiments of the present invention. A media stream is processed (Block 200). Thumbnail images are extracted at a periodic rate from the media stream (Block 202). A time code is extracted from the media stream that corresponds to each extracted thumbnail image (Block 204). The extracted thumbnail images and/or the corresponding time code is/are stored in memory (Block 206). The thumbnail images are concurrently processed with the media stream in a time sequence according to the time code associated with each extracted thumbnail image (Block 208). A graphical user interface is processed having a control that scrolls the thumbnail images (Block 210). The graphical user interface may display the media stream and concurrently scroll the extracted thumbnail images across the graphical user interface (Block 212). A first input may be received that selects an extracted thumbnail image (Block 214). The first input may select an extracted thumbnail image and/or a current time code as a beginning of a media snippet (Block 216). A second input may select another extracted thumbnail image and/or a later time code as an end of the media snippet (Block 218).

Figure 9:
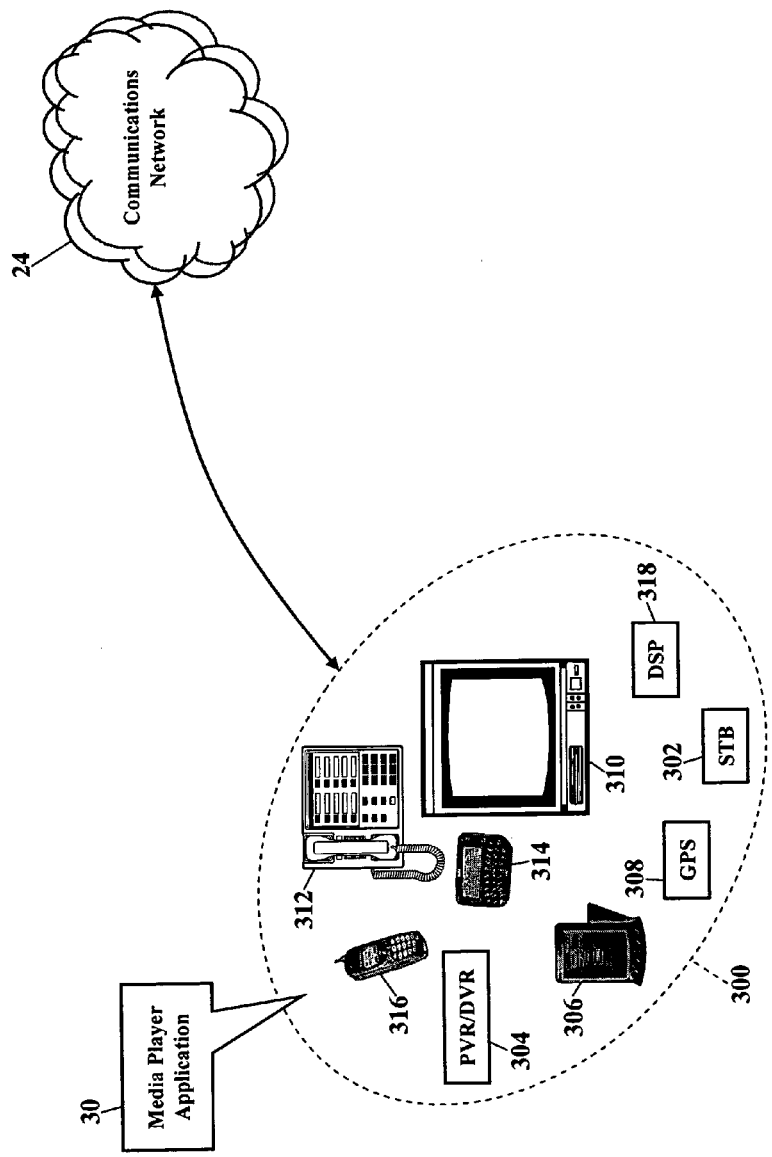
FIG. 9 depicts other possible operating environments for additional aspects of the present invention.

FIG. 9 depicts other possible operating environments for additional aspects of the present invention. FIG. 9 illustrates that the media player application 30 may alternatively or additionally operate within various other communications devices 300. FIG. 9, for example, illustrates that the media player application 30 may entirely or partially operate within a set-top box (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system and/or communications device utilizing a digital signal processor (DSP) 318. The communications device 300 may also include watches, radios, vehicle electronics, clocks, printers, gateways, and other apparatuses and systems. Because the architecture and operating principles of the various communications devices 300 are well known, the hardware and software componentry of the various communications devices 300 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment* (*Subscriber Identity Module—ME*) *interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

The media player application 30 may be physically embodied on or in a computer-readable media or medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the present invention to be easily disseminated. A computer program product comprises the media player application 30 stored on the computer-readable media or medium. The media player application 30 comprises computer-readable instructions/code for selecting images from media, as hereinabove explained. The media player application 30 may also be physically embodied on or in any addressable (e.g., HTTP, I.E.E.E. 802.11, Wireless Application Protocol (WAP), or BLUETOOTH®) wireless device capable of presenting an IP address.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A processor-implemented method of selecting images, comprising:
   receiving, by a communications device comprising a processor, a media stream at a first resolution;
   extracting, by the communications device, a plurality of thumbnail images from the media stream;
   extracting a time code from the media stream that corresponds to each extracted thumbnail image;
   processing the extracted thumbnail images in a time sequence according to the time code associated with each extracted thumbnail image;
   scrolling the plurality of thumbnail images across a first portion of a display device while concurrently displaying the media stream on a second portion of the display device;
   receiving a selection, by a user, of one of the plurality of thumbnail images;
   in response to the selection, sending a request to a server for a higher resolution image of the selected thumbnail image which is at a higher resolution than the first resolution, the request comprising data identifying the selected thumbnail image; and
   in response to the request, receiving the higher resolution image of the selected thumbnail image.

2. A method according to claim 1, further comprising the step of processing a graphical user interface having a control that scrolls the plurality of thumbnail images.

3. A method according to claim 1, further comprising the step of storing the extracted thumbnail images in memory.

4. A method according to claim 1, further comprising the steps of i) receiving a first input that selects an extracted thumbnail image as a beginning of a media snippet and ii) receiving a second input that selects another extracted thumbnail image as an end of the media snippet.

5. A method according to claim 1, further comprising the steps of i) receiving a first input that selects a current time code from the media stream as a beginning of a media snippet and ii) receiving a second input that selects a later time code as an end of the media snippet.

6. A system, comprising:
   a media player application stored in memory; and
   a processor communicating with the memory and with the media player application,
the system processing a media stream received at a first resolution to:
   extract a plurality of thumbnail images at a periodic rate;
   extract a time code from the media stream that corresponds to each extracted thumbnail image;
   process the extracted thumbnail images in a time sequence according to the time code associated with each extracted thumbnail image;
   scroll the plurality of thumbnail images across a first portion of a display device while concurrently displaying the media stream on a second portion of the display device;
   receive a first selection, by a user, of a first thumbnail image of the plurality of thumbnail images;
   in response to the first selection, send a request to a server for a higher resolution image of the selected thumbnail image which is at a higher resolution than the first resolution, the request comprising data identifying the selected thumbnail image; and
   in response to the request, receive the higher resolution image of the selected thumbnail image.

7. A system according to claim 6, wherein the system processes a graphical user interface having a control that scrolls the plurality of thumbnail images.

8. A system according to claim 6, wherein the system stores the extracted thumbnail images in the memory.

9. A system according to claim 6, wherein the system i) receives a first input that selects an extracted thumbnail image as a beginning of a media snippet and ii) receives a second input that selects another extracted thumbnail image as an end of the media snippet.

10. A system according to claim 6, wherein the system i) receives a first input that selects a current time code from the media stream as a beginning of a media snippet and ii) receives a second input that selects a later time code as an end of the media snippet.

11. A computer program product comprising non-transitory computer-readable media storing instructions for performing the steps:
   processing a media stream received at a first resolution;
   extracting thumbnail images at a periodic rate from the media stream;
   extracting a time code from the media stream that corresponds to each extracted thumbnail image;
   storing the extracted thumbnail images in memory;
   processing the extracted thumbnail images in a time sequence according to the time code associated with each extracted thumbnail image;
   processing the thumbnail images to scroll the thumbnail images across a first portion of a display device while concurrently processing the media stream for display on a second portion of the display device;
   receiving a first input that selects a first thumbnail image as a beginning of a media snippet;
   receiving a second input that selects a second thumbnail image as an end of the media snippet;
   sending a request to a server for a higher resolution media snippet than the first resolution, the request comprising data identifying the first thumbnail image and the second thumbnail image; and
   receiving the higher resolution media snippet.

12. A computer program product according to claim 11, further comprising instructions for processing a graphical user interface that displays the media stream and that concurrently scrolls the extracted thumbnail images across the graphical user interface.

* * * * *